(12) United States Patent
Yu

(10) Patent No.: US 6,313,404 B1
(45) Date of Patent: Nov. 6, 2001

(54) BOX STRUCTURE FOR ELECTRIC SWITCHES

(76) Inventor: Tsung-Mou Yu, No. 4, Alley 2, Lane 23, Sec. 3, Pa Te Road, Panchiao, Taipei (TW)

(*) Notice: Subject to any disclaimer, the term of this patent is extended or adjusted under 35 U.S.C. 154(b) by 0 days.

(21) Appl. No.: 09/516,230

(22) Filed: Mar. 1, 2000

(30) Foreign Application Priority Data

Nov. 25, 1999 (TW) ............................................ 88220088 U

(51) Int. Cl.[7] .................................................. H01H 9/02
(52) U.S. Cl. .............................. 174/58; 174/50; 220/3.8; 439/538; 33/528
(58) Field of Search ................................. 174/58, 50, 53; 220/3.2, 3.3, 4.02, 3.94, 3.92, 3.9, 3.8; 33/528, DIG. 10; 200/237, 276.1, 277.1; 439/538

(56) References Cited

U.S. PATENT DOCUMENTS

| | | | |
|---|---|---|---|
| 5,491,902 | * 2/1996 | Uhrin et al. | 33/528 X |
| 5,693,909 | * 12/1997 | McEwen | 174/58 |
| 5,823,821 | * 10/1998 | Tohanczyn, Jr. | 439/538 |
| 5,833,110 | * 11/1998 | Chandler et al. | 220/3.9 |
| 5,912,445 | * 6/1999 | Takedomi | 200/276.1 |
| 6,051,785 | * 4/2000 | Baldwin et al. | 174/54 |
| 6,201,187 | * 3/2001 | Burbine | 174/53 |
| 6,223,445 | * 5/2001 | Schuette, Jr. et al. | 33/528 |

FOREIGN PATENT DOCUMENTS

| | | | |
|---|---|---|---|
| 2230146 | * 10/1990 | (GB) | 174/58 |
| 0264514 | * 10/1989 | (JP) | 174/58 |
| 406225428 | * 8/1994 | (JP) | 174/58 |

* cited by examiner

*Primary Examiner*—Dean A. Reichard
*Assistant Examiner*—Dhiru R Patel
(74) *Attorney, Agent, or Firm*—Bacon & Thomas, PLLC

(57) ABSTRACT

A box structure for electric switches provided with an opening to allow assembling of the requisite parts for the switch in the body, wherein, two engaging grooves are provided respectively on the two external lateral sides of the body, the engaging grooves cooperate with engaging portions provided on engaging pieces having engaging lobes integrally connected therewith. The engaging pieces are made of material with better resiliency than that for the body. The engaging lobes have beveled surfaces that are coarse surfaces in order to make firm connection after the box structure is engaged in a switch receiving seat. The box structure is different from that of conventional box structures in the mode of assembling, a user can individually change the damaged parts by detaching and reassembling, especially the lobes and their related parts in the box structure which have the largest damage rate. In this way, money can be saved, and the requirement of the environmental protection can be satisfied.

17 Claims, 10 Drawing Sheets

BOX STRUCTURE FOR ELECTRIC SWITCHES

BACKGROUND OF THE INVENTION

1. Field of the Invention

The present invention is related to a box structure for electric switches, and especially to such a box structure wherein the parts thereof can be separately produced and assembled or changed for new ones.

2. Description of the Prior Art

A conventional electric switch structure is as shown in FIG. 1, in selling, the parts thereof are all sealed and packed in the body of the electric switch structure, only with a push button and a plurality of electric conductive pieces B of an internal electric circuit board exposed to the exterior of its body A. When the switch structure is mounted in a switch receiving seat, the conductive pieces B are connected to a given electric wire, turning on/off of the switch structure is controlled by pressing the push button. In general assembling, the body A of the switch is assembled and secured in a switch receiving seat 4 (referring to FIG. 4), wherein, the body A of the switch is provided on the mutually opposite lateral sides thereof each with a pair of elastic engaging pieces A1 tilting outwardly which are formed integrally on each side of the body A of the switch. The upper ends of the engaging pieces A1 are formed each an engaging lobe A11 in the shape of ">", so that when the body A of the switch is put in the switch receiving seat 4 (referring to FIG. 4), the lower end with a smaller size of the body A of the switch can be smoothly put in, thereby the tilting engaging pieces A1 can also be put in. The engaging lobes A11 will be pressed to contract elastically, until the engaging lobes A11 on the upper ends of the engaging pieces A1 pass through the opening 41 of the switch receiving seat 4 (referring to FIG. 4). Then the engaging lobes A11 spring apart to grasp the peripheral edges of the opening 41 for securing. If there is no switch receiving seat 4, the body A of the switch can be directly placed in a hole in a wall panel 5 (referring to FIG. 5) to render the engaging lobes A11 of the engaging pieces A1 to grasp the inner wall of the hole (referring to FIG. 5), or the bottom periphery of all the sides of the body A of the switch is adhered to or locked on the surface of the wall panel 5 for securing.

However, the conventional electric switch structure has at least the following defects:

1. The engaging pieces are integrally formed with the body of the switch, hence material for them shall be identical, however, the engaging pieces provide elastic compression and stretching functions for grasping, they are subjected to breakage after multiple pressing actions. Once an engaging piece is broken, the switch must be wholly changed. This is wasteful in concerning money.
2. The parts are all sealed and packed in the body of the switch, damage of any part will be considered as damage of the whole assembly which allows no normal operation. Because the parts can not be detached individually for examination and change, the whole assembly shall be changed.
3. Except the waste of money which is also a waste of resource, the above stated two situations make burdens for the natural environment, and thereby do not meet the requirement of the environmental protection.

SUMMARY OF THE INVENTION

The present invention is an improvement in a box structure for electric switches, an object of the present invention is to provide a box structure for electric switches of which the body of the switch and the engaging pieces thereof can be separately produced and assembled, the engaging pieces can be made of material with better resiliency and tenacity, so that the whole box structure can have larger engaging strength.

The second object of the present invention is to provide a box structure for electric switches; wherein, the body of the switch, the cover and the engaging pieces are all separately produced and assembled. If some parts are damaged during assembling and disassembling, they can be changed individually, and waste can be avoided. This meets the requirement of economy.

The third object of the present invention is to provide a box structure for electric switches; wherein, the body of the switch has an assembling opening to allow assembling of the related parts in the body; the opening then is fixedly covered with a cover. When any part is damaged, it can be detached for examination and changing, it is no necessity to change the whole switch, hence money can be saved, and the requirement of the environmental protection is satisfied.

Based on the above statement, the box structure for electric switches of the present invention is provided with an assembling opening to allow assembling of the requisite parts for the switch in the body, and two engaging grooves are provided respectively on the two external lateral sides of the body, the engaging grooves cooperate with engaging portions provided on two engaging pieces having engaging lobes integrally connected therewith. The engaging pieces are made of material with better resiliency than that for the body of the switch. The engaging lobes have beveled surfaces that are coarse knurled grasping surfaces in order to make firm connection after the box structure is connected with a switch receiving seat.

The present invention will be apparent in its features, objects as well as functions after reading the detailed description of the preferred embodiments thereof in reference to the accompanying drawings.

DETAILED DESCRIPTION OF THE PREFERRED EMBODIMENT

Figure 1:
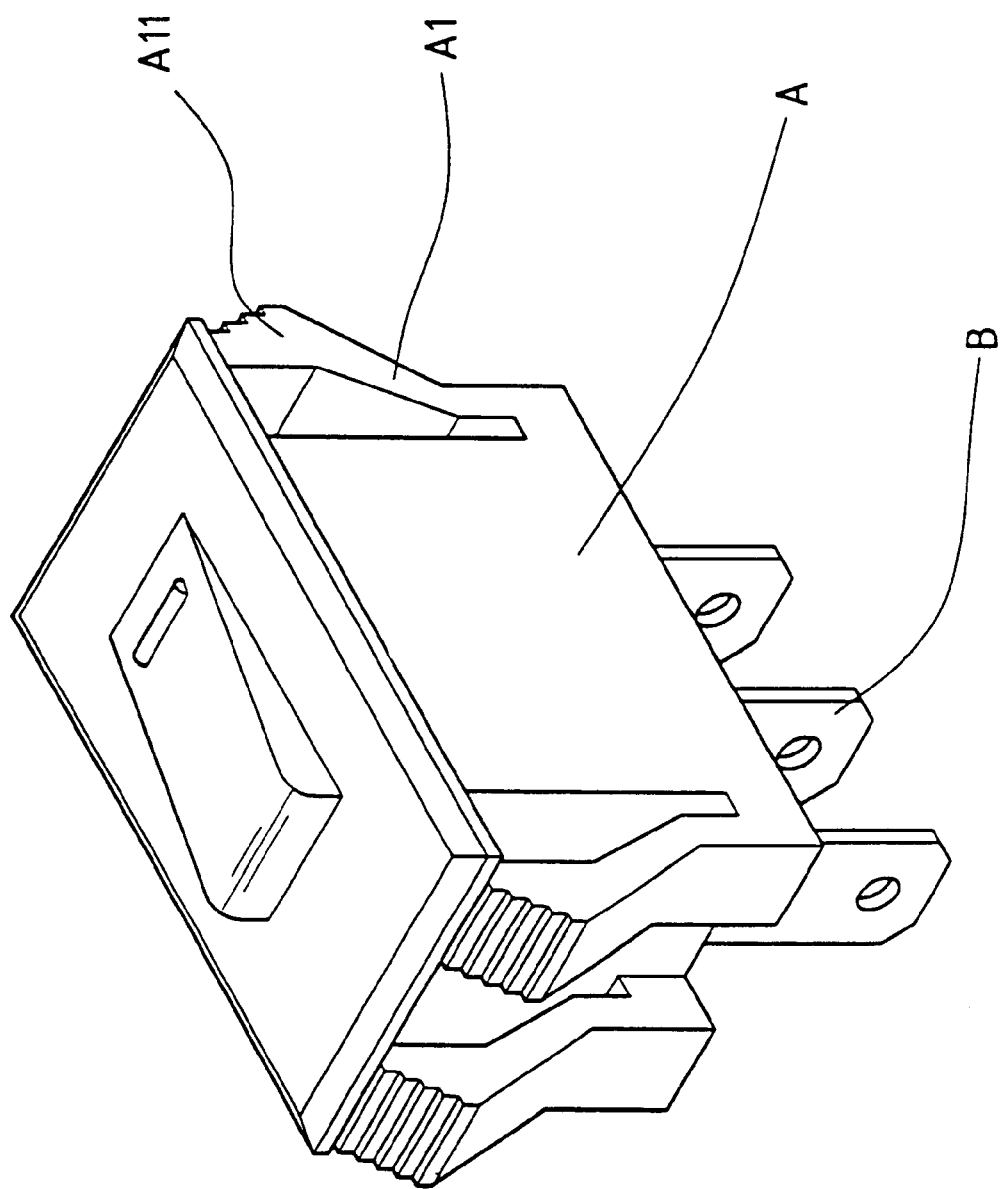
FIG. 1 is a perspective view showing the appearance of a conventional box structure for electric switches.
Figure 2:
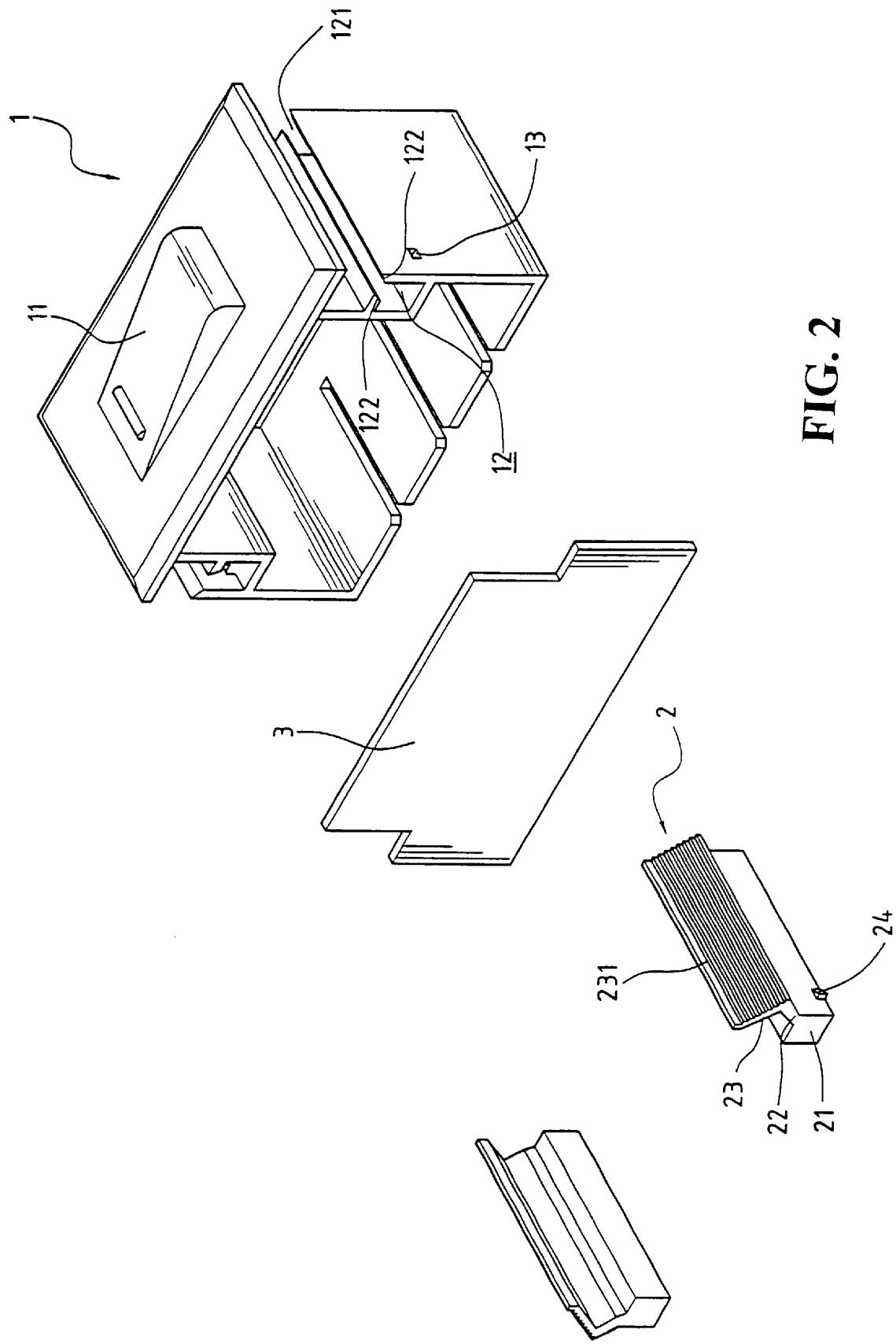
FIG. 2 is an analytic perspective view of the present invention.
Figure 3:
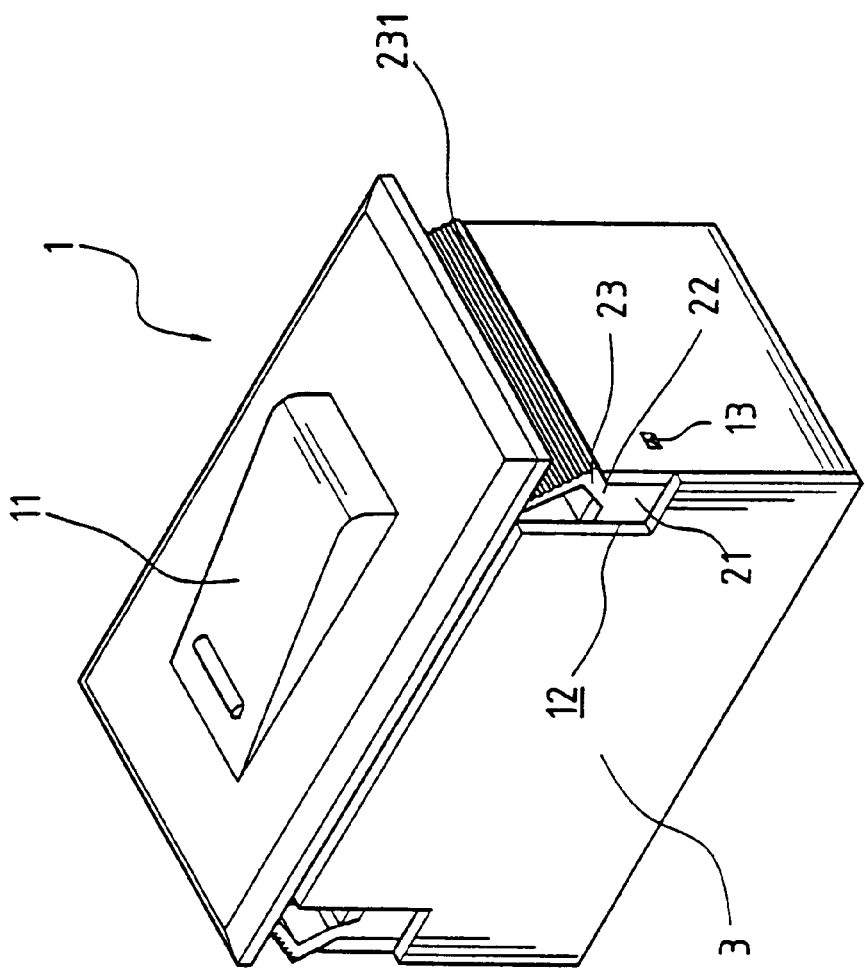
FIG. 3 is a perspective view of the present invention after assembling.

As shown in FIGS. 2 and 3 which are respectively an analytic perspective view of the present invention and a perspective view after assembling of the present invention, the box structure for electric switches provided by the present invention is comprised of:

A body 1 of an electric switch, being provided with an opening to allow assembling of the requisite parts for the switch, the upper surface thereof is provided with a push button 11. The body 1 of the electric switch is further provided on the upper portions of the mutually opposite lateral sides thereof with two engaging grooves 12 each with an upper opening 121 and each being provided on the bottom of an outer lateral side thereof with a positioning hole 13.

Two engaging pieces 2, being made of material with better resiliency and tenacity, the bottom of each engaging piece 2 is an engaging portion 21 in the shape of a lengthy post and having a positioning protrusion 24 with a beveled surface and on the external side near the bottom of the engaging piece 2. The engaging portion 21 connects with an engaging neck 22 which in turn connects with an upper engaging lobe 23 in the shape of ">". The engaging lobe 23 has an upper beveled surface that is a coarse knurled grasping surface 231.

A cover 3, the cover 3 is provided for covering the opening of the body 1.

When in assembling, the engaging portions 21 of the engaging pieces 2 are embedded in the engaging grooves 12 of the body 1, the engaging necks 22 of the engaging pieces 2 are thereby led into the upper openings 121 and abutted tightly each against two beveled surfaces 122 at both sides of each upper opening 121. When the positioning protrusions 24 reach the positioning holes 13, the engaging pieces 2 are completely and tightly combined with the body 1 in position.

When the related parts for the body 1 are assembled in the body 1, the cover 3 is put on and assembled on the opening of the body 1. In this embodiment, the way of connecting can be adhering or hot melting; and the connecting step of the cover 3 with the body 1 can be done before or after assembling of the engaging pieces 2.

Figure 4:
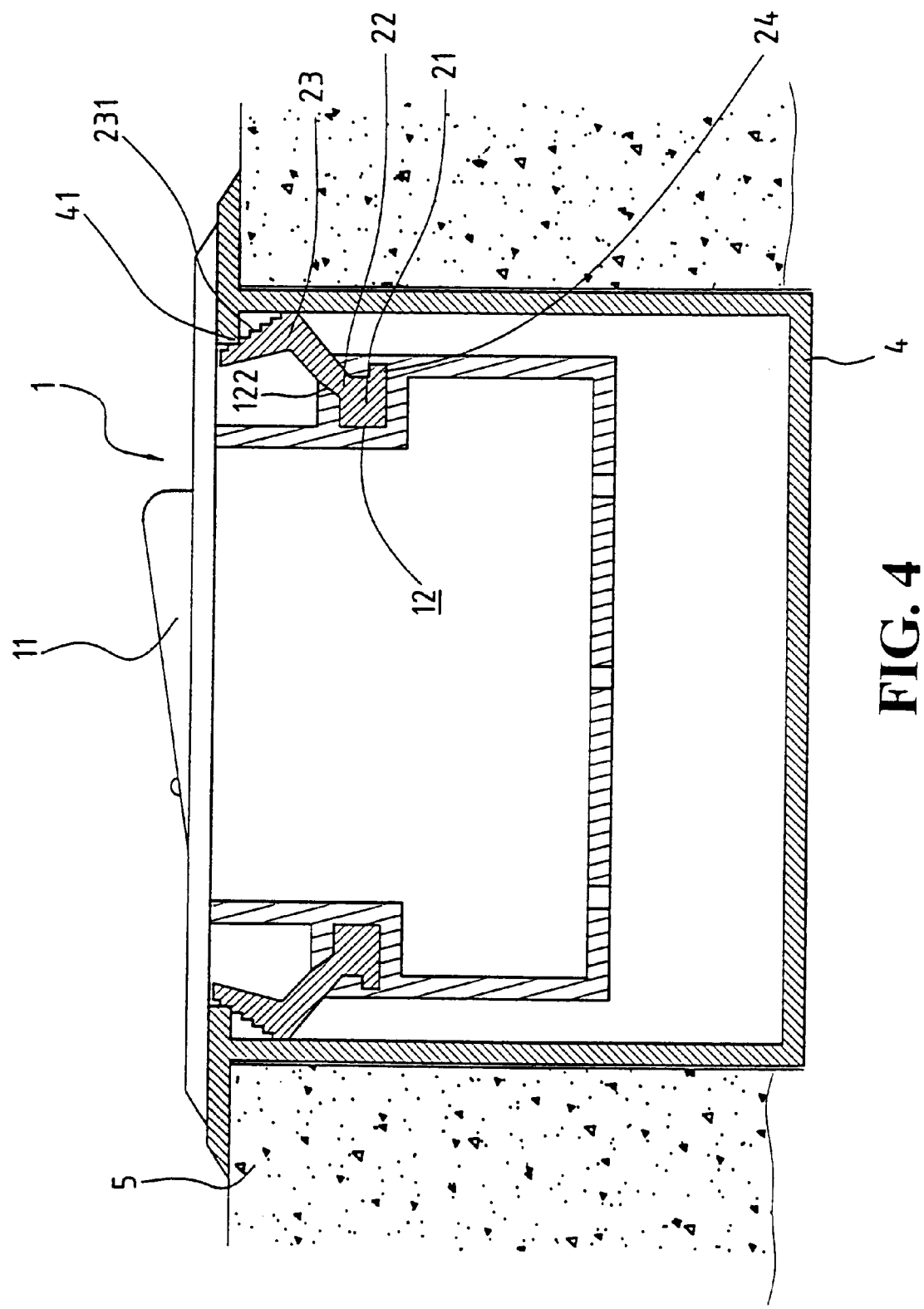
FIG. 4 is a sectional view showing the present invention is mounted in a switch receiving seat.

Referring again to FIG. 4 which is a sectional view showing the present invention is mounted in a switch receiving seat, generally, after assembling of the above mentioned box structure for electric switches, the body 1 is inserted into the switch receiving seat 4 smoothly due to its smaller size, the engaging pieces 2 are pressed to contract elastically and are inserted into the switch receiving seat 4 through the opening 41 of the switch receiving seat 4, then the engaging lobes 23 on the upper portions of the engaging pieces 2 pass through the opening 41 of the switch receiving seat 4 to spring apart to render the coarse knurled grasping surface 231 on the engaging lobes 23 to grasp the lower corners on the edges of the opening 41 for securing.

By all means, it is possible that a wall may have no switch receiving seat 4, then the body 1 of the switch can be directly placed in a hole in the wall panel 5 to render the engaging lobes 23 of the engaging pieces 2 to grasp the inner wall of the hole of the wall panel 5, or the bottom periphery of all the sides of the body 1 of the switch is adhered to or locked on the surface of the wall panel 5 for securing.

Figure 5:
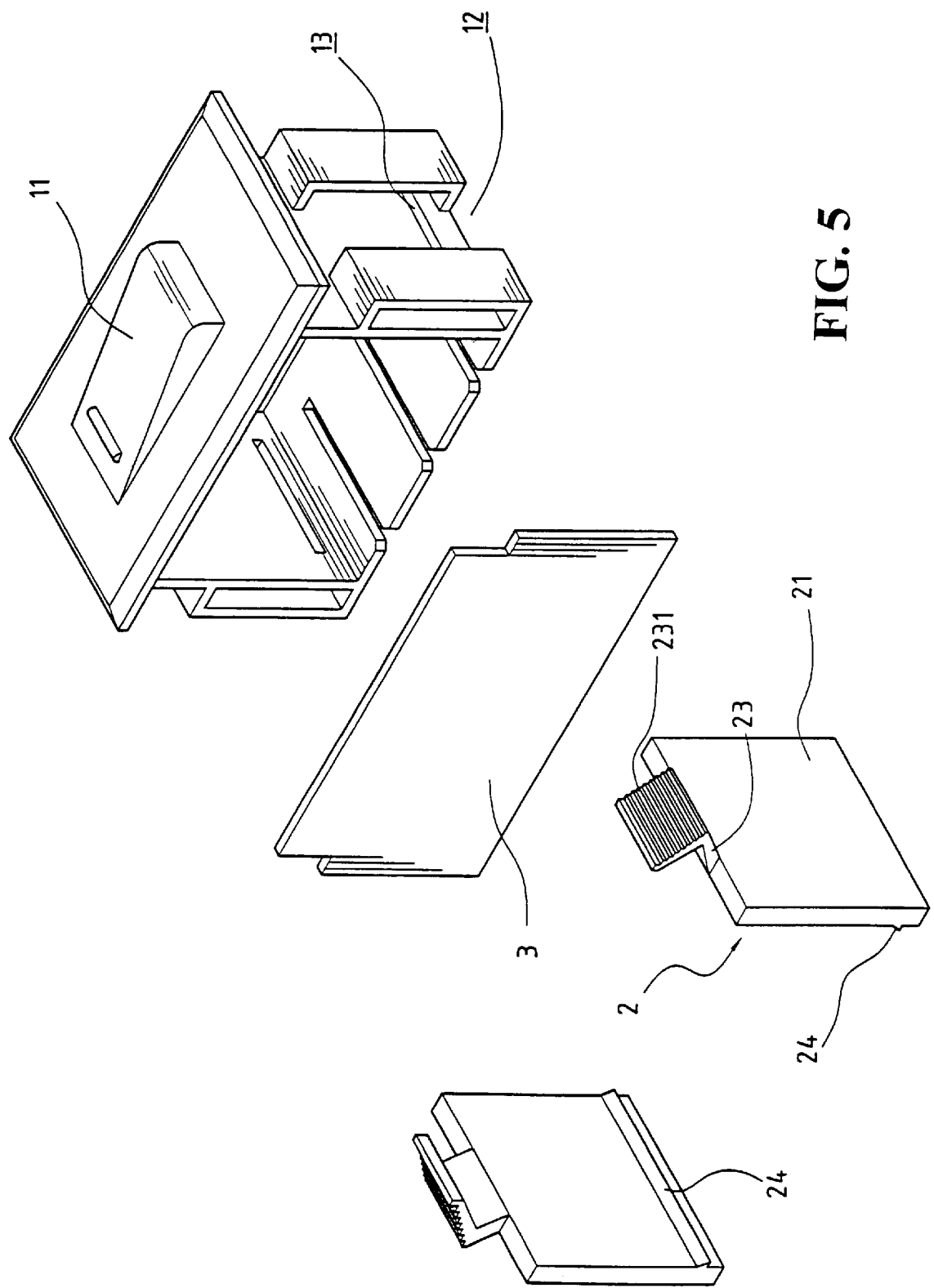
FIG. 5 is a perspective view of the second embodiment of the present invention.

Referring to FIG. 5 which is an analytic perspective view of the second embodiment of the present invention, wherein, the body 1 of the switch is provided on the mutually opposite lateral sides thereof each with a pair of plate like members extending from the bottom outwardly and then upwardly to a predetermined height and turn back to the body 1 of the switch to form therebetween a pair of vertical engaging grooves 12. A lengthy positioning hole 13 is provided on each lateral wall of the body 1 of the switch internally of the lower portion of its corresponding engaging groove 12. The lower portion of each of the engaging pieces 2 is a rectangular engaging portion 21 corresponding to an engaging groove 12, and the engaging piece 2 is provided near the inside bottom thereof with a positioning protrusion 24 with a beveled surface in cooperating with the lengthy positioning hole 13. The engaging piece 2 is integrally provided thereon with an upper engaging lobe 23 in the shape of ">". The engaging lobe 23 has an upper beveled surface that is a coarse knurled grasping surface 231.

When in assembling, the engaging portions 21 of the engaging pieces 2 are placed in through the lower opening of the engaging grooves 12 of the body 1. When the positioning protrusions 24 of the engaging pieces 2 reach the positioning holes 13, the beveled surfaces on the positioning protrusions 24 can thereby be engaged with the positioning holes 13, so that the engaging pieces 2 are tightly combined with the body 1 in position. The connecting step of assembling the cover 3 and assembling of the box structure for electric switches with the switch receiving seat 4 are the same as that of the aforementioned first embodiment.

Figure 6:
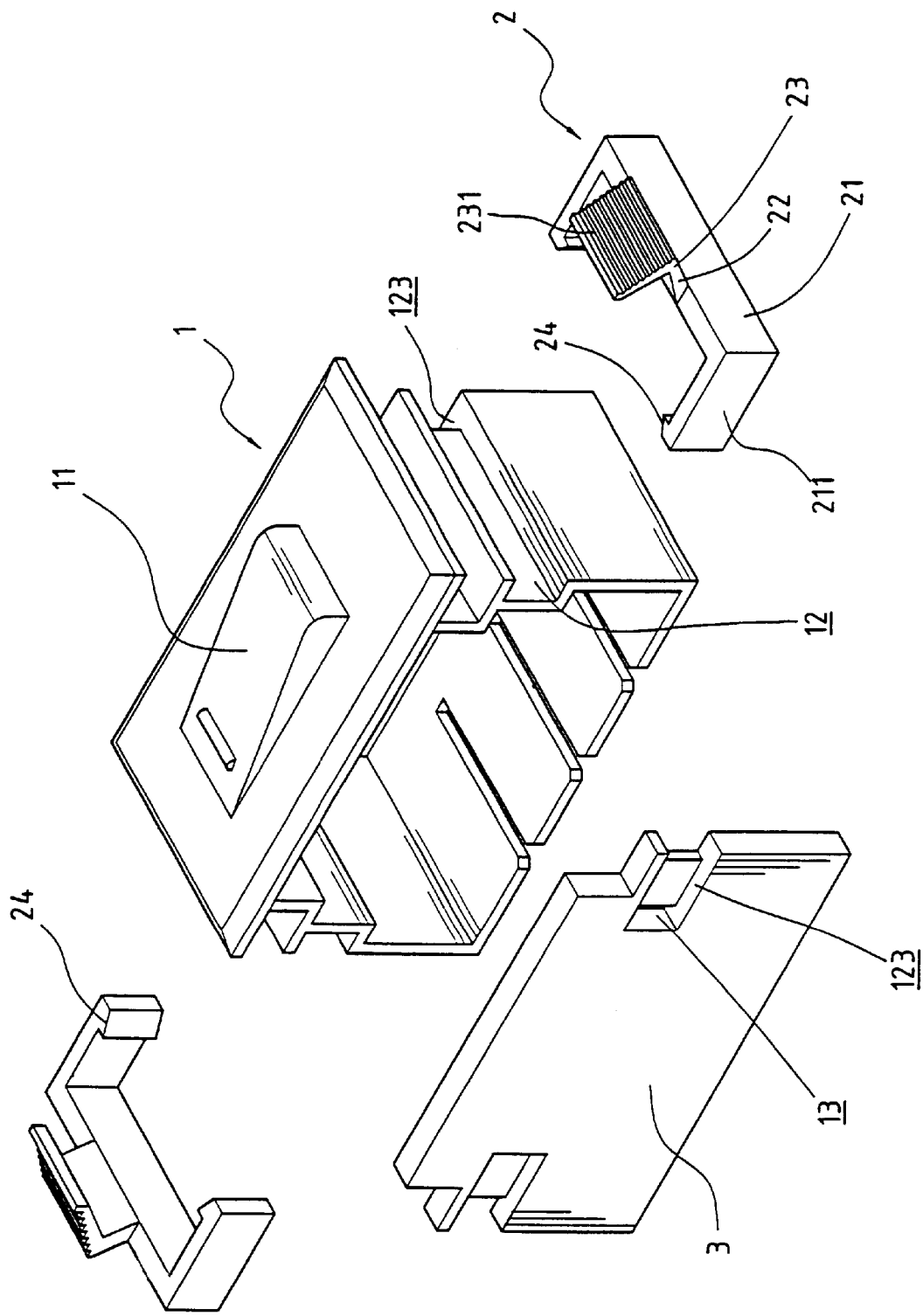
FIG. 6 is an analytic perspective view of the third embodiment of the present invention.

Referring to FIG. 6 which is an analytic perspective view of the third embodiment of the present invention, wherein, the body 1 of the switch is provided on both lateral sides thereof with an engaging groove 12 at an upper position close to the middle level thereof and opened at both ends. The engaging pieces 2 each has an engaging portion 21 in the shape of "U", the engaging portion 21 has two clamping arms 211 orthogonally extending from the two ends of the base thereof. The clamping arms 211 are provided on the ends thereof respectively with a positioning protrusion 24. The engaging portion 21 connects with an engaging neck 22 which in turn connects with an upper engaging lobe 23 in the shape of ">". The engaging lobe 23 has an upper beveled surface that is a coarse knurled grasping surface 231. The cover 3 is provided near the upper portion of each lateral edge thereof corresponding to the position of an engaging groove 12 with a clamping groove 123 with an opened end. The closed end of the clamping groove 123 is provided with a positioning hole 13 cooperating with one of the positioning protrusions 24. The body 1 of the switch is provided on the rear side thereof in opposition to the side juxtaposing the cover 3 with the same kind of clamping grooves 123 and positioning holes 13 (not shown).

When in assembling, the related parts for the body 1 are assembled in the body 1 in the first place, then the cover 3 is put on the opening of the body 1 to align the clamping grooves 123 with the engaging grooves 12, and the clamping arms 211 of the engaging pieces 2 are inserted and pushed along the opened end of the clamping grooves 123, until the positioning protrusions 24 on the clamping arms 211 are engaged in the corresponding positioning holes 13 for positioning. At this time, the engaging portions 21 of the engaging pieces 2 are tightly engaged in the engaging grooves 12. Thereby, the third embodiment of the box structure for electric switches of the present invention is completed.

Figure 7:
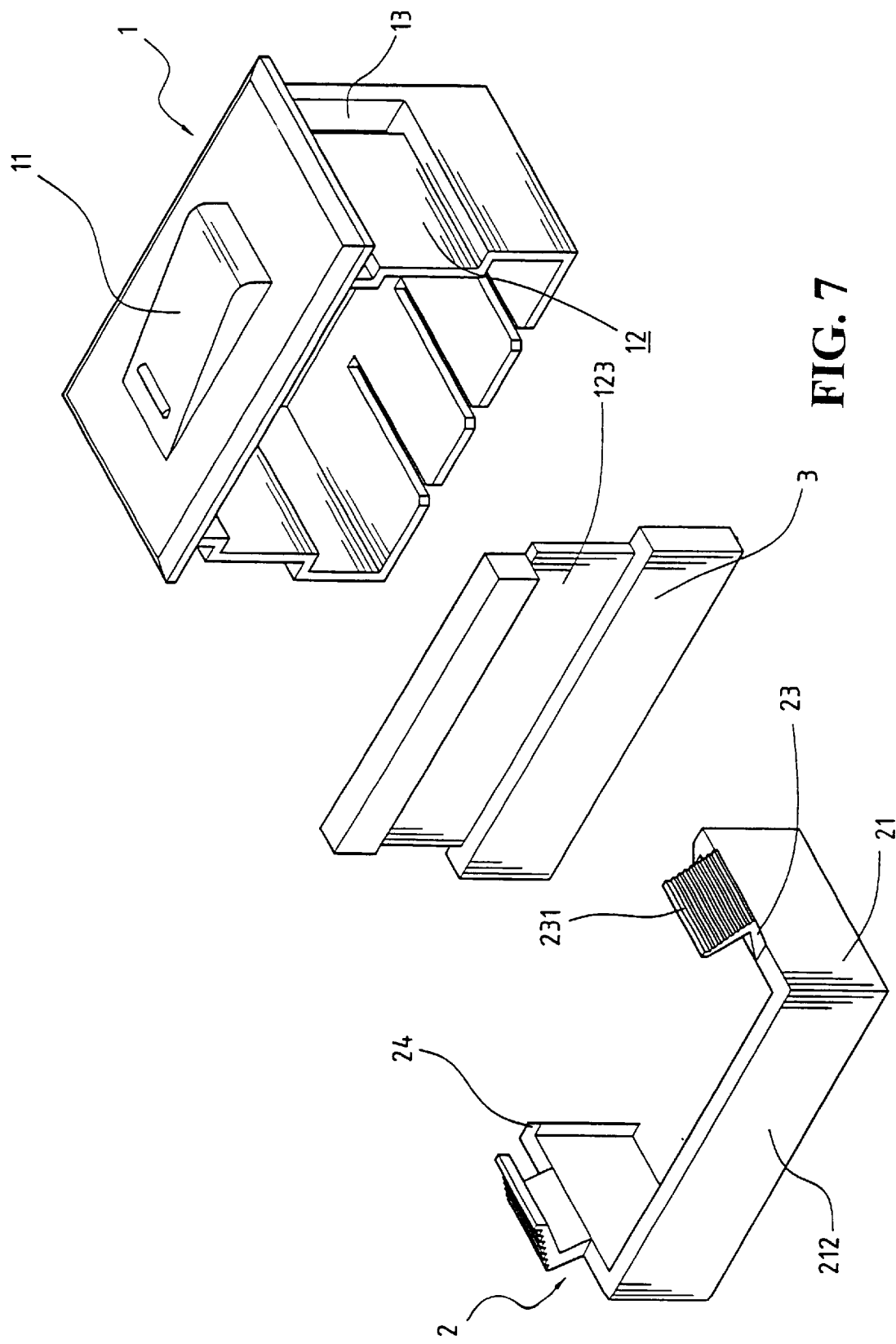
FIG. 7 is an analytic perspective view of the fourth embodiment of the present invention.

Referring to FIG. 7 which is an analytic perspective view of the fourth embodiment of the present invention, wherein, the body 1 of the switch is provided on the upper side thereof with a push button 11, and on the mutually opposite lateral sides thereof each with an engaging groove 12 opened at one end, the closed end of the engaging groove 12 has a positioning hole 13. The cover 3 is provided at the level corresponding to that of either of the engaging grooves 12 with a clamping groove 123. The engaging portions 21 as the lower portions of an engaging piece 2 are integrally connected with a connecting section 212 to form a "U" shape. The free ends of the engaging portions 21 are provided each with a positioning protrusion 24. The engaging portions 21 are provided thereon each with an engaging lobe 23 having an upper beveled surface that is a coarse knurled grasping surface 231.

When in assembling, the cover 3 covers the opening of the body 1, and the two engaging portions 21 of the engaging piece 2 are inserted and pushed through the opened ends of the engaging grooves 12, until the positioning protrusions 24 are engaged in the corresponding positioning holes 13 for positioning. At this time, the connecting section 212 is tightly engaged in the clamping groove 123, and assembling is completed.

Figure 8:
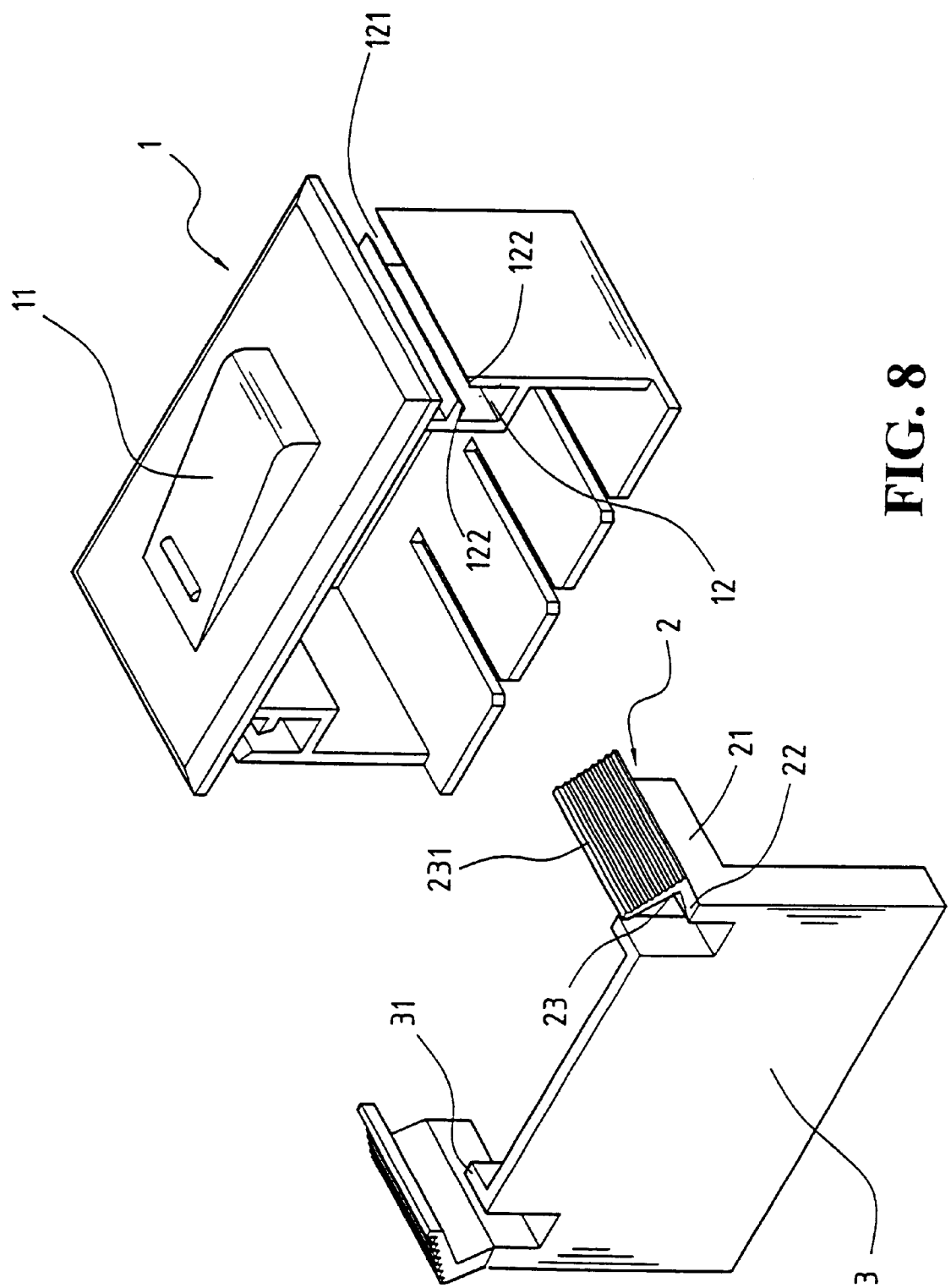
FIG. 8 is an analytic perspective view of the fifth embodiment of the present invention.

Referring to FIG. 8 which is an analytic perspective view of the fifth embodiment of the present invention, wherein, the body 1 of the switch is just the same as that of the first embodiment, the difference is that, the engaging pieces 2 and the cover 3 in the first embodiment are integrally combined in the present embodiment, and a small section of strengthening protrusion 31 is extended from the location near the top of each edge of the cover 3 to strengthen the cover 3. When in assembling the box structure for electric switches, the external surfaces of the strengthening protrusions 31 abut tightly against the upper lateral walls of the body 1 in order to get firmer assembling.

Figure 9:
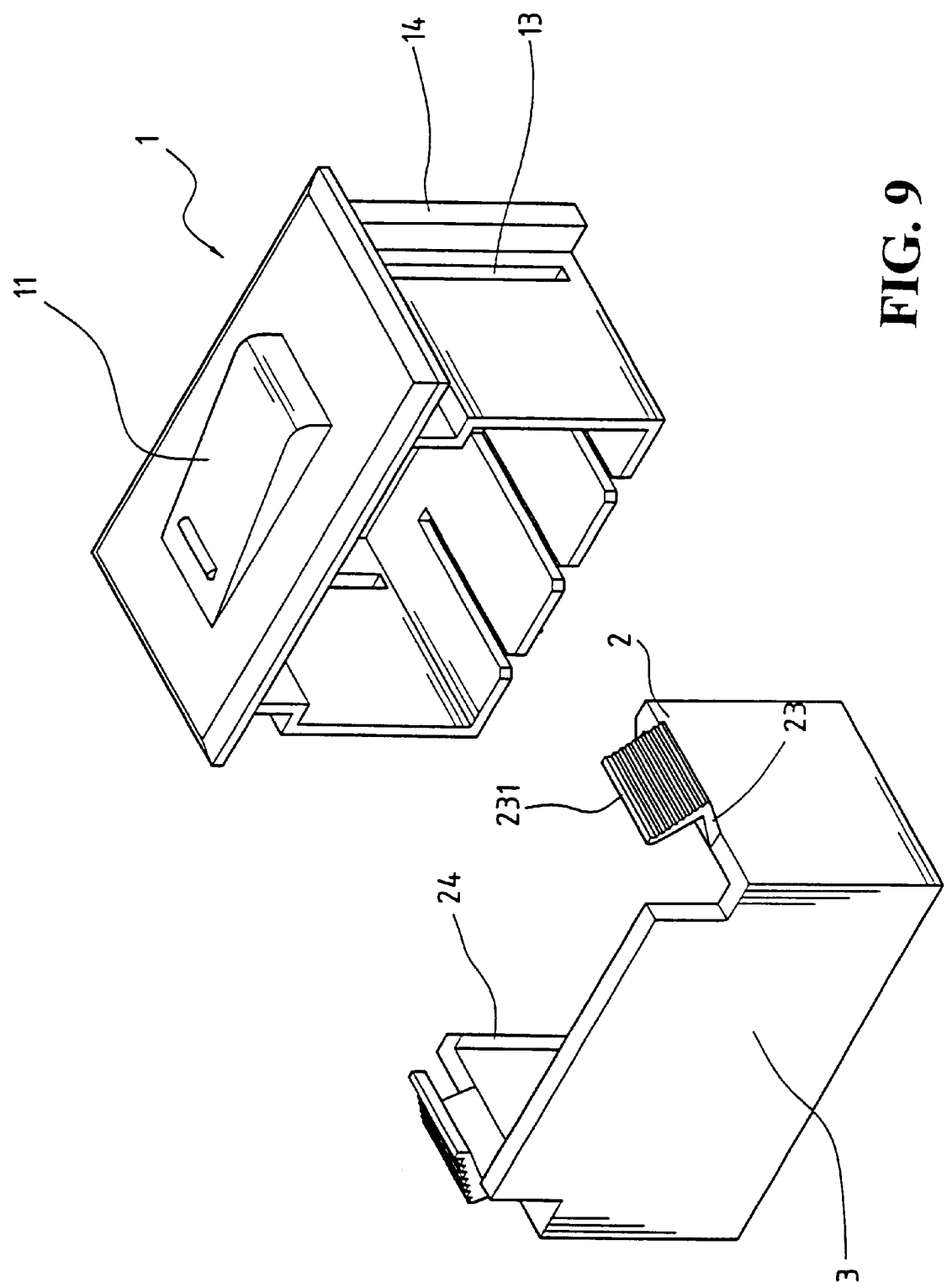
FIG. 9 is an analytic perspective view of the sixth embodiment of the present invention.

Referring to FIG. 9 which is an analytic perspective view of the sixth embodiment of the present invention, wherein, the body 1 of the switch is provided on the upper surface thereof with a push button 11, and is provided on the mutually opposite lateral sides thereof each with a protruding stop strip 14, a positioning hole 13 is provided parallelly near each of the protruding stop strips 14. Two engaging pieces 2 have their lower rectangular sheet portions integrally connected with a cover 3 respectively with their end edges, the free end edges of the rectangular sheet portions are provided each with a positioning protrusion 24 pointing inwardly.

When in assembling, the positioning protrusions 24 of the engaging pieces 2 are placed in the positioning holes 13 of the body 1, the positioning protrusions 24 are tightly abutted against the protruding stop strips 14, so that assembling of the sixth embodiment of the box structure for electric switches of the present invention can be surely completed.

Figure 10:
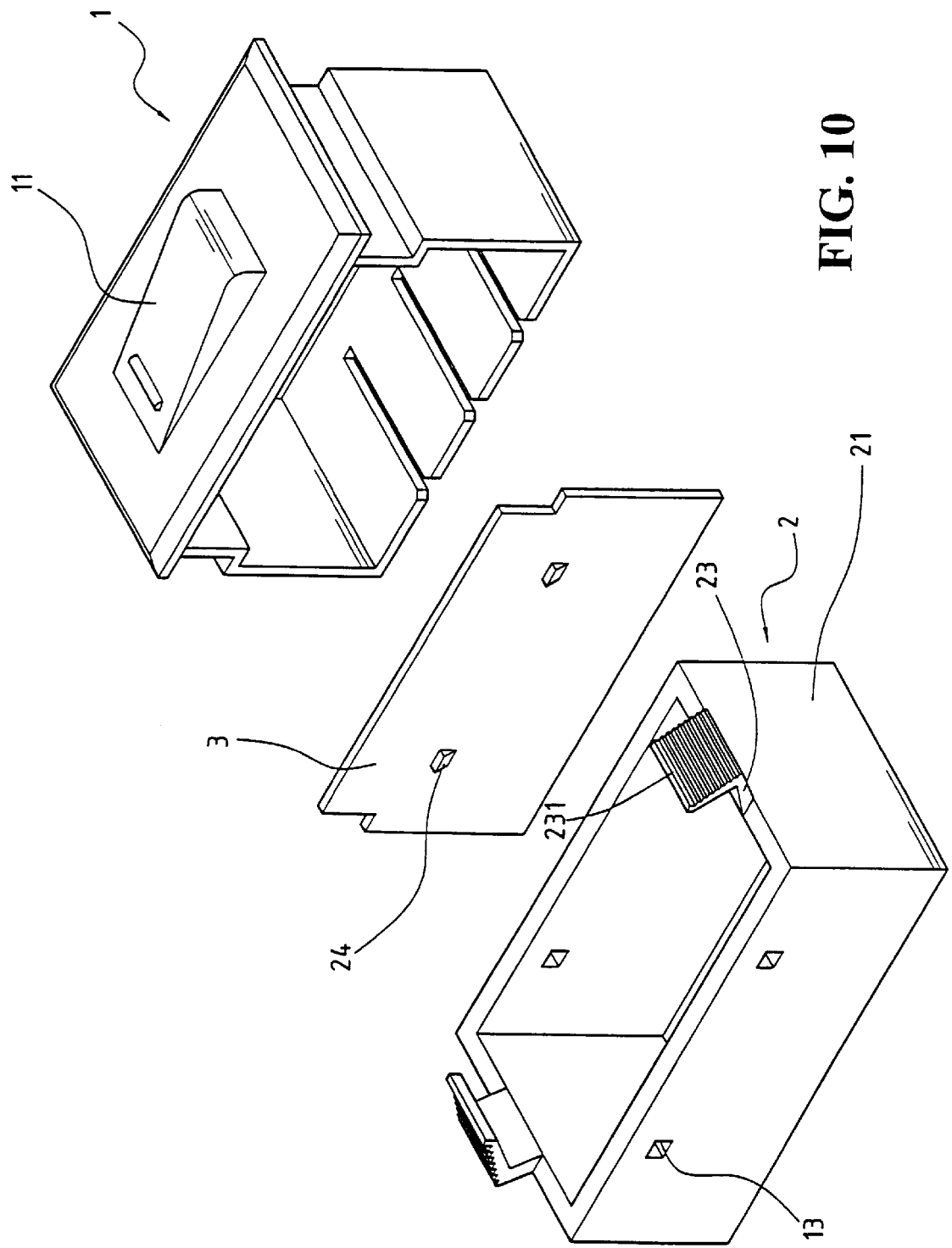
FIG. 10 is an analytic perspective view of the seventh embodiment of the present invention.

Referring to FIG. 10 which is an analytic perspective view of the seventh embodiment of the present invention, wherein, the body 1 of the switch is provided on the upper surface thereof with a push button 11, while the mutually opposite lateral sides thereof are not provided with the engaging grooves 12 as stated in the aforementioned embodiments. Wherein, the cover 3 is provided on the surface thereof with a plurality of wedge like positioning protrusions 24, the rear side of the body 1 in opposition to the opening of the body 1 of the electric switch also has a plurality of positioning protrusions 24 corresponding in position to those on the cover 3 (not shown). An engaging piece 2 is provided; the lower portion thereof is a rectangular hollow engaging portion 21 with the top and bottom thereof opened. A plurality of positioning holes 13 are provided on the cover 3 and the body 1 at the positions corresponding to the positioning protrusions 24 respectively, the engaging portion 21 is provided as the upper portion thereof with two mutually opposite engaging lobes 23 each being in the shape of ">", each of the engaging lobes 23 has a beveled surface that is a coarse knurled grasping surface 231.

When in assembling, the cover 3 is assembled on the opening of the body 1, then the cover 3 and the body 1 are together put in the hollow engaging portion 21 of the engaging piece 2 to engage the positioning protrusions 24 into corresponding ones of the positioning holes 13. Positioning of the members and assembling of the seventh embodiment of the box structure for electric switches of the present invention can be thus completed.

In the above stated second and seventh embodiments (FIGS. 5, 10), the connecting methods, steps and effects in assembling switch receiving seats 4 or wall panels 5 are the same as that of the aforementioned first embodiment.

At least several advantages as listed below can be obtained by providing the improved box structure for electric switches of the present invention:

1. The engaging pieces and the body of the switch are separately produced and assembled, the engaging pieces which are subjected to pressing force repeatedly can be made of material with better resiliency and tenacity, so that the whole assembly produced can have better strength and durability.

2. A box structure for an electric switch is provided wherein the body of the switch, the cover and the engaging pieces are all separately produced and assembled, during assembling and disassembling, the parts being damaged can be individually changed, and this is economic because waste can be avoided.

3. A box structure for an electric switch is provided wherein the body of the switch has an assembling opening to allow assembling of the related parts in the body, the opening then is fixedly covered with a cover. When any part is damaged, it can be detached for examination and changing, it is no necessity to change the whole switch, hence money can be saved, and the requirement of the environmental protection is satisfied.

The aforesaid is only for illustrating a preferred embodiment of the present invention, and not for giving any limitation to the scope of the present invention. Various modifications or changes can be made to the elements of the present invention without departing from the spirit, scope and characteristic of this invention and thus fall within the scope of the appended claims and are intended to form part of this invention.

What is claimed is:

1. A box structure for electric switches, being comprised of:

a body of an electric switch, being provided with an opening to allow assembling of the requisite parts for said switch, said body of said electric switch is further provided on the upper portions of the mutually opposite lateral sides thereof with two engaging grooves each with an upper opening;

two engaging pieces, the bottom of each of said engaging pieces is an engaging portion connecting with an engaging neck which in turn connects with an upper engaging lobe, said engaging lobe has a beveled surface that is a grasping surface; and a cover, being provided for covering said opening of said body;

when in assembling, said engaging portions of said engaging pieces are embedded in said engaging grooves of said body, said engaging necks of said engaging pieces are thereby led into said upper openings and abutted tightly against said upper openings, said engaging pieces thus are completely and tightly combined with said body in position;

the connecting step of said cover with said body is done before or after assembling of said engaging pieces.

2. A box structure for electric switches as claimed in claim 1, wherein,
said body of an electric switch is provided with a push button on the upper surface thereof.

3. A box structure for electric switches as claimed in claim 1, wherein,
said upper openings of said engaging grooves each has two beveled surfaces for abutting tightly against said engaging necks of said engaging pieces.

4. A box structure for electric switches as claimed in claim 1, wherein,
said engaging grooves each is provided on the bottom of an outer lateral side thereof with a positioning hole.

5. A box structure for electric switches as claimed in claim 1, wherein,
said engaging portions of said engaging pieces each is provided with a positioning protrusion in cooperating in assembling with one of said positioning holes.

6. A box structure for electric switches as claimed in claim 5, wherein,
said engaging pieces are made of material with better resiliency and tenacity than that for said body of said switch.

7. A box structure for electric switches as claimed in claim 1, wherein,
said engaging pieces each is integrally provided on the upper end thereof with said upper engaging lobe.

8. A box structure for electric switches as claimed in claim 7, wherein,
said upper engaging lobe has an upper beveled surface that is a coarse knurled grasping surface.

9. A box structure for electric switches as claimed in claim 7, wherein,
said engaging pieces are made of material with better resiliency and tenacity than that for said body of said switch.

10. A box structure for electric switches as claimed in claim 1, wherein,
said upper engaging lobe has an upper beveled surface that is a coarse knurled grasping surface.

11. A box structure for electric switches as claimed in claim 1, wherein,
said engaging pieces are made of material with better resiliency and tenacity than that for said body of said switch.

12. A box structure for electric switches, being comprised of:
a body of an electric switch, being provided with an opening to allow assembling of the requisite parts for said switch, said body is provided on the upper surface thereof with a push button, and is provided on the mutually opposite lateral sides thereof each with a vertical engaging groove, a positioning hole is provided internally of the lower portion of said engaging groove;
two engaging pieces, the lower portion of each of said engaging pieces is an engaging portion being to face to said engaging groove, each of said engaging pieces is provided near the inside bottom thereof with a positioning protrusion with a beveled surface on cooperating with said positioning hole, each of said engaging pieces is integrally provided thereon with an upper engaging lobe, said engaging lobe has an upper beveled surface that is a coarse knurled grasping surface; and
a cover, being provided for covering said opening of said body;
when in assembling, said engaging portions of said engaging pieces are placed in through said engaging grooves of said body, when said positioning protrusions of said engaging pieces reach said positioning holes, said positioning protrusions are engaged with said positioning holes, so that said engaging pieces are tightly combined with said body in position, then said cover is connected with adhesive or by hot melting to said body of said electric switch.

13. A box structure for electric switches, being comprised of:
a body of an electric switch, being provided with an opening to allow assembling of the requisite parts for said switch, said body is provided on the upper surface thereof with a push button, said body of said switch is provided on both lateral sides thereof with an opened engaging groove, said body of said switch is provided on the front side thereof facing to a cover with clamping grooves and positioning holes;
two engaging pieces, each has an u shape engaging portion, said engaging portion has two clamping arms orthogonally extending from two free ends thereof, said clamping arms are provided on the ends thereof respectively with a positioning protrusion, said engaging portion connects with an upper engaging lobe, said engaging lobe has an upper beveled surface that is a coarse knurled grasping surface;
said cover, being provided near the upper portion of each lateral edge thereof corresponding to the position of one of said engaging grooves with one of said clamping grooves with an opened end, a closed end of said clamping groove is provided with a positioning hole cooperating with one of said positioning protrusions:
when in assembling, the related parts for said body are assembled in said body in the first place, then said cover is put on said opening of said body to align said clamping grooves with said engaging grooves, and said clamping arms of said engaging pieces are inserted and pushed along said opened end of said clamping grooves, until said positioning protrusions on said clamping arms are engaged in said corresponding positioning holes for positioning, at this time, said engaging portions of said engaging pieces are tightly engaged in said engaging grooves.

14. A box structure for electric switches, being comprised of:
a body of an electric switch, being provided with an opening to allow assembling of the requisite parts for said switch, said body is provided on the upper surface thereof with a push button, and on the mutually opposite lateral sides thereof each with an engaging groove opened at one end, the closed end of said engaging groove has a positioning hole,
an engaging piece having its lower engaging portions integrally connected with a connecting section to form a "U" shape, the free ends of said engaging portions are provided each with a positioning protrusion, said engaging portions are provided thereon each with an engaging lobe having an upper beveled surface that is a coarse knurled grasping surface,
a cover, being provided at the level corresponding to that of either of said engaging grooves with a clamping groove.

15. A box structure for electric switches, being comprised of:

a body of an electric switch, being provided with an opening to allow assembling of the requisite parts for said switch, said body is provided on the upper surface thereof with a push button, and on the mutually opposite lateral sides thereof with two engaging grooves each with an upper opening, two engaging pieces, the bottom of each of said engaging pieces is an engaging portion in the shape of a post, said engaging portion connects with an upper engaging lobe, said engaging lobe has an upper beveled surface that is a coarse knurled grasping surface, said engaging pieces are integrally combined with a rectangular cover, and a small section of protrusion is extended from a location near the top of each edge of said cover;

when in assembling said box structure for electric switches, the external surfaces of said protrusions abut tightly each against the upper lateral walls of said body in order to get firmer assembling.

16. A box structure for electric switches, being comprised of:

a body of an electric switch, being provided with an opening to allow assembling of the requisite parts for said switch, said body is provided on the upper surface thereof with a push button, and is provided on the mutually lateral opposite sides thereof each with a protruding stop strip, a positioning hole is provided parallelly near each of said protruding stop strips;

two engaging pieces, having their lower rectangular sheet-like engaging portions integrally connected with a rectangular cover respectively with their end edges, said engaging portions each connects with an upper engaging lobe, said engaging lobe has an upper beveled surface that is a coarse knurled grasping surface, free end edges of said rectangular sheet-like portions are provided each with a positioning protrusion pointing inwardly;

when in assembling, said positioning protrusions of said engaging pieces are placed in said positioning holes of said body of said electric switch, said positioning protrusions are tightly abutted against said protruding stop strips.

17. A box structure for electric switches, being comprised of:

a body of an electric switch, being provided with an opening to allow assembling of the requisite parts for said switch, said body is provided on the upper surface thereof with a push button, and is provided on a lateral side in opposition to said opening of said body of said electric switch with a plurality of positioning protrusions;

an engaging piece, the lower portion thereof is a rectangular hollow engaging portion with the top and bottom thereof opened, a plurality of positioning holes are provided on a cover and said body at the positions corresponding respectively to said positioning protrusions, said engaging portion is provided as the upper portion thereof with two mutually opposite engaging lobes, each of said engaging lobes has a beveled surface that is a coarse knurled grasping surface;

said cover, being provided on the surface thereof with a plurality of positioning protrusions corresponding in position to those on said body;

when in assembling, said cover is assembled on said opening of said body, then said cover and said body are together put in said hollow engaging portion of said engaging piece to engage said positioning protrusions of said body into corresponding ones of said positioning holes.

* * * * *